United States Patent [19]

Kraffczyk et al.

[11] 3,873,269

[45] Mar. 25, 1975

[54] INDICATOR FOR THE DETERMINATION OF UREA

[75] Inventors: Friedrich Kraffczyk; Roland Helger, both of Darmstadt, Germany

[73] Assignee: Merck Patent Gesellschaft Mit Beschrankter Haftung, Darmstadt, Germany

[22] Filed: June 7, 1973

[21] Appl. No.: 367,952

[30] Foreign Application Priority Data
Oct. 11, 1972 Germany............................ 2249647

[52] U.S. Cl. .... 23/230 B, 23/253 TP, 195/103.5 R, 252/408
[51] Int. Cl. ............................................. G01n 33/16
[58] Field of Search ........ 23/230 B, 230 R, 252 TP; 195/103.5 R, 127; 252/408

[56] References Cited
UNITED STATES PATENTS

| | | | |
|---|---|---|---|
| 3,427,225 | 2/1969 | Harvill et al. | 195/103.5 |
| 3,531,254 | 9/1970 | Okuda | 23/230 B |
| R26,125 | 12/1966 | Chaney | 195/103.5 |

Primary Examiner—R. E. Serwin
Attorney, Agent, or Firm—Millen, Raptes & White

[57] ABSTRACT

A colorimetric indicator for the determination of urea, comprising a reaction system containing urease and a colorimetric pH indicator system arranged one above the other on absorbent supports. The reaction system is characterized by containing alkali carbonate and/or hydroxide and optionally one or more organic acids, and by having a pH range of about 8 to 10.

12 Claims, No Drawings

INDICATOR FOR THE DETERMINATION OF UREA

BACKGROUND OF THE INVENTION

This invention relates to a colorimetric test strip indicator for the detection and determination of urea in liquids, especially in body fluids, e.g., blood, serum, plasma and urine. The accurate determination of urea levels in body fluids is of great importance in the diagnosis of renal insufficiency. Because of the widespread clinical testing for urea in body fluids, an indicator is desirable which permits even unskilled personnel to conduct a safe and rapid urea determination, even with samples of untreated whole blood.

In addition to the exact spectrophotometric tests, various colorimetric indicators are known by means of which urea can be determined semi-quantitatively without complicated apparatus. This detection is generally based on the enzymatically catalyzed hydrolysis of urea, preferably by means of urease, to ammonia and carbon dioxide. The liberated gaseous ammonia is then determined with the aid of a conventional pH indicator system.

The colorimetric urea indicator described in the German publication Periodical of Medical Laboratory Technique 5: 319 (1964) consists of a strip of filter paper provided with two separate zones, namely a reaction zone containing urease together with a phosphate buffer and a separate pH indicator zone. This indicator, however, has the significant disadvantage that it has a useful shelf life of only about one month, even when stored in a dark bottle and in a desiccator. Due to progressive decomposition of the reaction zone, it is necessary in order to obtain even moderately reliable analytical values to newly calibrate the test strip prior to each urea determination. Additionally, the phosphate buffer - urease mixture present in the reaction zone has a pH of only about 7.5; in this pH range, it has been found that the vapor pressure of the ammonia liberated during urea determination is too low for ensuring accurate and reproducible semi-quantitative determinations. The evolution of ammonia which takes place both in low amounts and at a slow rate results in only a minor color intensity and zone sharpness on the indicator zone, which makes accurate readings difficult even for experienced clinicians.

Another indicator strip described in German Patent 1,245,619 has three reaction systems on an absorbent support. However, this indicator likewise has a number of disadvantages. The determination can only be effected with serum, and not with whole blood. Such a test requires centrifuging the blood in order to obtain the serum; accordingly, the amount of sample necessary for testing is much larger than, for example, can be obtained from a lancet prick. In addition to the greater amount of work required, such as pipetting of the serum and affixing the indicator strip within the test tube, a further disadvantage is that test results are obtained only after about a half hour reaction time, since the ammonia formed in the first reaction system is present in a solution and must first migrate by chromatography into the second reaction system where the gas is quantitatively liberated. The indicator strip requires rather large amounts of serum and makes at least one pipetting step necessary, so that this cannot be considered the simplest possible test. For the functioning of this test, fluid transport between the two zones is required. Whole blood is hardly suitable for this purpose because the erythrocytes clog the pores and migration during chromatography takes place only very slowly.

Accordingly, the indicator strips known heretofore for the determination of urea have substantial practical deficiencies. Therefore, there is a genuine need for an indicator strip useful in the clinical laboratory, which could be tested with a minimum quantity of whole blood, without pipetting, and yet ensures a highly accurate and rapid read-off of the urea content. Such an indicator strip is made available by the present invention.

OBJECTS OF THE INVENTION

Accordingly, it is a general object of this invention to provide improved test strips for the colorimetric detection of urea.

Another object of this invention is to provide test strips for the colorimetric detection of urea which have an improved shelf life.

A further object of this invention is to provide test strips for semi-quantitative analysis for urea in body fluids.

A more particular object of this invention is to provide test strips wherein the urea content of body fluids can be read off directly.

Upon further study of the specification and appended claims, further objects and advantages of this invention will become apparent to those skilled in the art.

SUMMARY OF THE INVENTION

Briefly, the above and other objects are attained in one aspect of the present invention by providing a colorimetric indicator suitable for the rapid semi-quantitative detection of urea in solution, the indicator comprising:

a. a reaction zone containing an absorbent carrier impregnated with an enzyme capable of hydrolyzing urea into ammonia and carbon dioxide and at least one alkali metal carbonate or alkali metal hydroxide in an amount sufficient to provide a pH of 8 – 10 when said reaction zone is moistened with water and to raise the vapor pressure of ammonia released by enzymatic hydrolysis of urea; and b. a separate pH indicator zone containing an absorbent carrier impregnated with a colorimetric indicator responsive to ammonia liberated by said reaction zone.

DETAILED DISCUSSION

The present invention provides an indicator test strip suitable for semi-quantitative colorimetric detection and determination of urea in liquids, comprising a reaction system containing urease and an indicator system on a support, wherein the reaction system additionally contains a stabilizing amount of alkali carbonate and/or alkali hydroxide and optionally one or more organic acids, and has a pH range of about 8 – 10 when wetted with water.

A particularly advantageous feature of this invention is the stability of urease in the indicator system of the present invention. The optimum activity of urease, as is known, is in the pH range of 7 – 8. The shelf life of urease is dependent on the pH, and on an absorbent support, e.g., paper, the maximum stability is at a pH of about 7. Up to a pH of 8, urease stability is still satisfactory when using a buffer present in sufficient concentration. In this pH range, however, the vapor pressure of ammonia which is liberated is too low for ensuring accurate semi-quantitative determinations. At higher pH values, the stability of the urease is insufficient; thus, for example, at a pH of 8.7, with most buffers, the urease not only does not exhibit sufficient stability but also there is insufficient vapor pressure of the ammonia. Surprisingly, it has now been found that the vapor pressure of the ammonia can be increased by the presence of a suitable amount of alkali carbonate and/or alkali hydroxide and optionally one or more organic acids, making it now possible to operate in a pH range of about 8 – 10 wherein the activity of the urease is not impaired.

It is possible by means of the indicator of the present invention to provide a precise, rapid test for urea, wherein all of the components of the reaction system are present in a single zone separate from the indicator system. This test strip is further distinguished from those heretofore available in that a very accurate and reproducible urea determination can be accomplished with only a single droplet of unpretreated whole blood. The components of the reaction system of the indicator according to this invention, preferably urease, alkali carbonate and/or hydroxide, optionally organic acids and stabilizers, are selected and proportioned so that the urease, when the indicator strip is stored at about 0° – 4° C., reaches a shelf life of more than one year and the ammonia is liberated at a sufficient speed from the reaction zone. Urease having an activity of 5 U/mg. (U=the amount of enzyme converting 1 $\mu$ mol of substrate in one minute under standard conditions) is preferred for the indicator of this invention.

In order to increase the ammonia vapor pressure in a relatively low pH range of about 8 – 10, wherein ammonia normally cannot be liberated at sufficient speed, alkali carbonates and/or hydroxides are provided in accordance with this invention, optionally together with organic acids.

Suitable alkali metal carbonates and/or hydroxides include but are not limited to the potassium, rubidium and cesium salts, e.g., potassium carbonate, and especially rubidium carbonate and cesium carbonate and/or rubidium hydroxide and cesium hydroxide, especially cesium carbonate.

The organic acids which can optionally be present in the indicator of this invention are generally ring substituted benzoic acids, having a pK of 0.2 – 8, preferably 0.4 – 4, wherein the substituents can be identical or different and represent hydrogen, carboxy, hydroxy, nitro, halogen and/or the sulfonic acid group. Furthermore suitable are pyridinecarboxylic acids and pyridinesulfonic acids, as well as chloroacetic acid, hydroxydiacetic acid, methanetrisulfonic acid, aminomethanesulfonic acid, oxalic acid, or 4,6-dichlororesorcinol. Preferred acids include but are not limited to phthalic acid, isophthalic acid, benzene-1,2,3,5-tetracarboxylic acid, mellitic acid, salicylic acid, 5-chlorosalicylic acid, 5-nitrosalicylic acid, 5-sulfosalicylic acid, 2-nitrobenzoic acid, 3-nitrobenzoic acid and pyridine-2,4-dicarboxylic acid. Especially suitable are phthalic acid, isophthalic acid, salicylic acid, 5-sulfosalicylic acid, 5-nitrosalicylic acid and mellitic acid.

The reaction system can also contain, as additional stabilizers, antioxidation stabilizing amounts of organic substances containing SH-groups, such as, e.g., 1,4-dithioerythritol, 1,4-dithiothreitol, cysteine, glutathione, thioglycolic acid, etc., especially 1,4-dithioerythritol or 1,4-dithiothreitol.

The detection of the amount of ammonia liberated from the reaction system takes place in a conventional manner with the aid of an indicator system containing one or more acids and/or acid salts and/or acidic buffer mixtures, as well as one or more acid-base or redox indicators which trigger a color change in the presence of ammonia. Suitable acids and/or acid salts and/or buffer mixtures include but are not limited to tartaric acid, oxalic acid, citric acid, phthalic acid, amidosulfonic acid, sodium bisulfate, potassium bisulfate, iron ammonium sulfate, copper sulfate, hydroxylammonium salts, tartaric acid/alkali carbonate, oxalic acid/alkali oxalate, oxalic acid/alkali tartrate, etc.

Suitable acid-base indicators are, in principle, the customary organic pH indicators which change color in a pH range of between 7 and 1, inclusive. However, for maximum sensitivity and zone sharpness of the indicator strip, it is more advantageous to choose an indicator having a changeover end point in the pH range of 6.8 to 3.0, inclusive. Suitable indicators include but are not limited to bromcresol green, bromphenol red, bromcresol purple, bromphenol blue, Congo red, methyl orange, ethyl orange, fluorescein, resazurin, methyl red, ethyl red, propyl red, chlorphenol red, o-nitrophenol and litmus.

In place of one of the conventional organic pH indicators, it is also possible to utilize another pH-dependent colorimetric reaction, e.g., decolorization of the iron rhodanate complex in the basic pH range. Especially suitable pH indicators are bromcresol green, bromphenol red, bromcresol purple and iron rhodanate.

Suitable absorbent carriers for the indicator of this invention include all those inert water absorbent or water permeable carriers customarily in use for such tests. Most widespread is the utilization of filter paper, but other absorbent cellulose or synthetic resin products can likewise be employed. The absorbent carriers, preferably filter paper, are impregnated in a conventional manner with impregnating solutions containing the reagents necessary for urea determination. The thus-impregnated and dried papers can be processed into square, rectangular or other desired shape zones which, in turn can be glued, sealed or otherwise affixed on synthetic resin films, paper strips, metal strips, or other backing in a manner known per se.

The absorbent carriers for the reaction system and the indicator system can also be applied, prior to impregnation, in strip shape to a synthetic resin tape backing and can be cut, after impregnation, at right angles to the direction of the strips, into handy dip sticks.

The procedure for manufacturing the indicator strip of the present invention is advantageously as follows: Two strips of an absorbent material, preferably filter paper, are applied to a synthetic resin film backing having a width of, for example, 7 – 8 cm. The first strip, intended for receiving the reaction system, has a width of 2 – 20 mm., preferably about 6 mm., and terminates at the lower edge of the synthetic resin film. The second strip is applied with its lower edge at a spacing of 1 – 20 mm., preferably about 3 – 7 mm., with respect to the upper edge of the first strip. This second strip has a width of 2 – 50 mm., preferably about 15 – 30 mm., and is intended for receiving the reagents for the indicator system. After impregnation and cutting, indicator sticks are obtained having a length of about 7 – 8 cm., and a width of about 5 – 7 mm.

In order to produce the reaction system, the impregnating solution for the absorbent carrier advantageously contains, in one liter of distilled water, the following ingredients:

| BROAD | PREFERRED | |
|---|---|---|
| 10–100 g. | 30–60 g. | urease, preferably of water-soluble urease having an activity of 5 U/mg. |
| 5–500 millimoles | 20–100 millimoles | alkali carbonate and/or alkali hydroxide, preferably of rubidium carbonate or cesium carbonate |
| 0–500 millimoles | 20–70 millimoles | one or more organic acids |
| 0.1–1.0 g. | 0.3–0.6 g. | an organic substance containing SH-groups, preferably 1,4-dithioerythritol or 1,4-dithiothreitol |

Impregnation with the above solutions followed by drying results in the preparation of a reaction zone uniformly Schleicher impregnated, gives a certain amount of the composition per unit of the absorbent substrate, which is dependent on the thickness thereof. When using filter pater Schlieicher & Schull No. 1450 CV as absorbent substrate the amount of the composition per square meter is about as follows:

| BROAD | PREFERRED | |
|---|---|---|
| 2.5–25 g. | 7.5–15 g. | urease |
| 1.2–120 millimoles | 5–25 millimoles | alkali carbonate and/or alkali hydroxide |
| 0–120 millimoles | 5–18 millimoles | one or more organic acids |
| 0.025–0.25 g. | 0.075–0.15 g. | an organic substance containing SH-groups |

The quantities of urease, alkali carbonate and/or hydroxide, and optionally organic acid must be selected with respect to one another so that, after application of the impregnating solution to the paper and after the drying thereof, a solution having a pH of 8 – 10, preferably 8.5 – 9.5 results after the renewed moistening with water.

The concentration of the acidic components in the indicator system must be adapted to the amount of ammonia developed in the reaction system. If the possible concentration range of urea in the test liquid is very large, as can be the case, for example, in blood and serum, it is advantageous under certain circumstances to employ two indicator zones having varying concentrations of acidic components. The various indicator systems are produced by impregnation in corresponding solutions. Preferably, the indicator system is applied to a single zone. In a particularly preferred embodiment, the absorbent support for the indicator system is imprinted with a millimeter graduation prior to the sealing and/or gluing step.

The indicator system is obtained by impregnation of the absorbent support with an aqueous or aqueous-alcoholic solution containing, dissolved in 1 liter, for example, the following components:

| BROAD | PREFERRED | |
|---|---|---|
| 0.01–200 g. | 3 –7 g. | of one or more acidic salts, and/or |
| 0.20– 2 g. | 0.2–0.8 g. | of one or more acids, and |
| 0.1 – 3 g. | 1 –1.5 g. | of one or more pH indicators. |

Impregnation with the above solutions followed by drying results in the preparation of an indicator zone uniformly impregnated, gives a certain amount of the composition per unit of the absorbent substrate, which is dependent on the thickness thereof. When using filter paper Schleicher & Schull No. 597 L as absorbent substrate the amount of the composition per square meter is about as follows:

| BROAD | PREFERRED | |
|---|---|---|
| 0.001–25 g. | 0.3 –1 g. | of one or more acidic salts, and/or |
| 0.002–0.25 g. | 0.02–0.1 g. | of one or more acids, and |
| 0.01 –0.4 g. | 0.1 –0.2 g. | of one or more pH indicators. |

In order to conduct the test, the absorbent support of the reaction system is moistened with the liquid to be tested, e.g., dipped for about 1 – 10 seconds into the liquid to be tested, or brought into direct contact with a drop of blood on the fingertip or at the earlobe. The indicator system disposed above the reaction system must not be moistened. Any excess test liquid is stripped off with a spatula or a stiff piece of cardboard. In order to prevent air movements between the reaction system and the indicator system, the indicator stick is preferably transferred into a container by means of which interference with the gas diffusion from the reaction zone into the indicator zone caused by air movement can be prevented. This container is preferably constructed so that the transfer of the indicator stick, moistened at the reaction system, can be achieved without impairment of the indicator system. The gaseous ammonia evolving during the determination effects a color change of the indicator system starting from the lower rim thereof. The length of the thusproduced color change can be directly read off from the millimeter graduations of the indicator system and is proportional to the urea present in the test liquid. The reading takes place after 5, 10, 15, 20, or 30 minutes. With the aid of a table or a graphic representation, the urea value pertaining to the read-off level of ascension at the selected reaction time is then derived.

The height of ascension correlates closely, especially after a longer reaction time, e.g., of 10 – 45 minutes, with the urea content found by the spectrophotometric method, even in case of low urea values in the normal range, e.g., less than 50 mg. %.

Without further elaboration, it is believed that one skilled in the art can, using the preceding description, utilize the present invention to its fullest extent. The following preferred specific embodiments are, there-

EXAMPLE 1

Production of the Reaction System

Filter paper (Schleicher & Schull, No. 601, 145CV, 2668, or VS 320) is impregnated with a solution containing, in 1 liter of water:

40.0 g.   urease (corresponding to 2 · 10⁵ U/l.)
    16.3 g.   cesium carbonate,
    3.4–9.8 g. an organic acid set forth in Table 1, and
    0.4 g.    1,4-dithioerythritol or 1,4-dithiothreitol dissolved therein, and is then dried. The thus-obtained impregnated filter paper is cut into small squares of about 6 × 6 mm., which are then applied to the lower end of synthetic resin strips about 6 × 75 mm. in size. The pH value of the moist reaction system is 8.9 – 9.2.

Preparation of the Indicator System

Filter paper (Schleicher & Schull, No. 597 L, 2992, 2040, or 2668) is impregnated with a 5% aqueous ethanol solution containing dissolved therein, per liter:

5.6  g.    sodium bitartrate,
    0.56 g.    tartaric acid, and
    1.1  g.    bromcresol green, and subsequently dried. The thus-obtained impregnated filter paper is cut into rectangles of about 6 × 25 mm. and applied approximately 4 mm. above the top rim of the reaction system to the synthetic resin strip.

When applying a drop of serum containing 80 mg. of urea per 100 ml. of test fluid to the reaction system of the indicator strip, and transferring the strip into a closed reaction chamber of the type described in copending, commonly assigned U.S. Pat. application Ser. No. 367,951, filed June 7, 1973, the contents of which are incorporated by reference herein. After 30 minutes, the ascension levels from the indicator system are measured. As indicated in Table I, the levels vary somewhat depending on the amount and type of organic acid employed.

Semiquantitative evaluation is carried out with the aid of either a table or a graphic illustration, wherein the associated urea values are read as a function of the ascension level and the reaction time. If the reaction time is kept constant, it is possible by a suitable concentration of the components in the reaction system to obtain a direct indication of the urea content in mg./100 ml. by multiplying the ascension level, in mm., by 10; this can be seen from the above table.

EXAMPLE 2

Filter paper (Schleicher & Schull, No. 2668) is impregnated in order to produce the reaction system, with a solution analogous to that of Example 1, but containing in place of cesium carbonate 7.5 g. of cesium hydroxide or 5.1 g. or rubidium hydroxide and 1.4 – 2.4 g. of one of the organic acids set forth in Table II. The indicator system is the same as in Example 1.

A thus-produced indicator strip has the ascension levels on the indicator system set forth in Table II after application of the test liquid of Example 1 and after a reaction time of 30 minutes, depending on the organic acid employed.

TABLE II

| No. | Acid | Impregnating Solution g./l. | Ascension Level at 30 minutes (mm.) |
|---|---|---|---|
| 13 | 3-Nitrobenzoic acid | 2.4 | 5.5 |
| 14 | 2-Nitrobenzoic acid | 2.4 | 5.5 |
| 15 | 5-Nitrosalicylic acid | 2.4 | 8.0 |
| 16 | 5-Chlorosalicylic acid | 2.3 | 6.5 |
| 17 | Benzene-1,2,3,5-tetracarboxylic acid | 1.4 | 5.0 |
| 18 | 4,6-Dichlororesorcinol | 2.4 | 6.5 |
| 19 | Pyridine-3-sulfonic acid | 2.3 | 5.0 |

This indicator stick likewise provides accurate semiquantitative urea determinations in the range of 20 to 200 mg. of urea per 100 ml. of test liquid.

EXAMPLE 3

An indicator stick is produced analogously to Example 1 wherein, however, the indicator system comprises an absorbent support produced by impregnating filter paper (Schleicher & Schull, No. 597 L) with an aqueous solution containing, per liter:

0.01 g.   hydroxylammonium chloride, and
    1.   g.   bromphenol red.

This indicator strip is especially suitable for the the determination of low urea concentrations, e.g., down to 0.5 mg./100 ml.

Similar results are obtained with indicator systems prepared, for example, by impregnation with the following solutions:

TABLE I

| No. | Acid | Quantity (g./l. of Impregnating Solution) | Ascension level at 30 minutes (mm.) |
|---|---|---|---|
| 1 | Chloroacetic acid | 4.5 | 8.0 |
| 2 | Hydroxydiacetic acid | 3.4 | 8.5 |
| 3 | Methanetrisulfonic acid | 5.8 | 8.0 |
| 4 | Aminomethanesulfonic acid | 6.0 | 8.5 |
| 5 | Oxalic acid | 3.5 | 8.5 |
| 6 | Phthalic acid | 4.9 | 7.5 |
| 7 | 5-Chlorosalicylic acid | 8.5 | 8.5 |
| 8 | 2-Nitrobenzoic acid | 9.8 | 7.5 |
| 9 | 5-Nitrosalicylic acid | 7.5 | 8.0 |
| 10 | 4,6-Dichlororesorcinol | 7.5 | 8.5 |
| 11 | Pyridine-2,4-dicarboxylic acid | 4.9 | 7.0 |
| 12 | Pyridine-3-sulfonic acid | 9.3 | 8.0 |

| | | |
|---|---|---|
| (a) | 5 g. | hydroxylammonium oxalate, |
| | 1 g. | tartaric acid, and |
| | 1.1 g. | bromcresol green |
| in | 1 liter | of 5% aqueous ethanol. |
| (b) | 100 g. | iron (III) ammonium sulfate and |
| | 1 g. | bromcresol green |
| in | 1 liter | of 5 % aqueous ethanol. |
| (c) | 340 g. | potassium rhodanate and |
| | 15 g. | iron (III) ammonium sulfate |
| in | 1 liter | of water. |

EXAMPLE 4

An indicator stick is produced as described in Example 1. When dipping these indicator sticks with the reaction system into a number of sera and whole blood samples of increasing urea concentration (24 – 57 mg. of urea per 100 ml.), the ascending levels on the indicator system are obtained at various reaction times, as set forth in Table III.

| | | |
|---|---|---|
| | 100.0 g. | urease, |
| | 16.3 g. | cesium carbonate, |
| | 2.2 g. | phthalic acid, and |
| | 0.4 g. | 1,4-dithioerythritol. |

The test strips are likewise suitable for detecting urea in body fluids. Similar results are obtained with reaction systems prepared by the impregnation with the following solutions:

| | | |
|---|---|---|
| (a) | 10.0 g. | urease, |
| | 11.6 g. | rubidium carbonate, |
| | 6.4 g. | phthalic acid, and |
| | 0.4 g. | 1,4-dithioerythritol. |
| (b) | 10.0 g. | urease, |
| | 1.63 g. | cesium carbonate, and |
| | 0.1 g. | glutathione. |

TABLE III

Ascending Level and/or Length (mm.) of the Changed-Over Indicator Zone in Dependence on the Urea Content in the Sample at various Reaction Times.

| Sample No. | Urea Content (mg./100 ml.) Determined Spectrophotometrically | Serum | | | | | Whole Blood | |
|---|---|---|---|---|---|---|---|---|
| | | 30 min. | 20 min. | 15 min. | 10 min. | 5 min. | 30 min. | 5 min. |
| 1 | 24 | 1 | Edge | — | — | — | Edge | — |
| 2 | 25 | 1.5 | 1 | Edge | — | — | 0.5–1.0 | — |
| 3 | 26 | 1.5 | 1 | Edge | — | — | 0.5–1.0 | — |
| 4 | 27 | 2 | 1 | Edge | — | — | 1 | — |
| 5 | 28 | 1.5 | 1 | Edge | — | — | Edge | — |
| 6 | 29 | 2 | 1.5 | 1 | — | — | 1.5 | — |
| 7 | 33 | 2 | 1 | 1 | — | — | 1 | — |
| 8 | 36 | 3 | 2 | 1.5 | Edge | — | 1 | — |
| 9 | 37 | 2.5–3.0 | 2 | 1 | Edge | — | 1.5 | — |
| 10 | 40 | 2.5–3.0 | 2 | 1.5 | Edge | — | 2 | — |
| 11 | 43 | 3.5–4.0 | 2.5 | 2 | 1 | — | 2.5 | — |
| 12 | 44 | 4–4.5 | 3 | 2 | 1.5 | Edge | 2 | — |
| 13 | 53 | 5 | 3 | 2.5 | 2 | 0.5 | 3 | — |
| 14 | 57 | 5.5 | 4 | 3 | 2 | 1.0 | 4 | Edge |

In the determination of urea in whole blood, the only sample (No. 14) which just exceeds the upper limit of the normal urea value, shows a slight discoloration of the lower edge of the indicator system after 5 minutes, whereas the samples with normal urea contents do not show any changeover. After a reaction time of 30 minutes, 24 mg. % of urea can clearly be detected; the length of the changed-over indicator system (ascending level) correlates very well with the urea contents determined by spectrophotometry. Comparison of test results obtained on whole blood with those obtained on the corresponding sera also shows that the analytical values obtained after 30 minutes with whole blood are obtained after only 15 – 20 minutes in the case of serum. The evaluation is conducted as set forth in Example 1.

EXAMPLE 5

An indicator stick is produced analogously to Example 1. The reaction system comprises an absorbent support produced by impregnating filter paper (Schleicher & Schull, 1450 CV) in an aqueous solution containing the following components per liter:

| | | |
|---|---|---|
| (c) | 40.0 g. | urease, |
| | 116.0 g. | rubidium carbonate, |
| | 75.0 g. | phthalic acid, and |
| | 0.4 g. | thioglycolic acid. |
| (d) | 40.0 g. | urease, |
| | 1.63 g. | cesium carbonate, and |
| | 0.4 g. | cysteine. |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A colorimetric indicator suitable for the rapid semiquantitative detection of urea in solution, said indicator comprising:

a. a reaction zone containing an absorbent carrier impregnated with an enzyme capable of hydrolyzing urea into ammonia and carbon dioxide and at least one alkali metal carbonate or alkali metal hydroxide in an amount sufficient to provide a pH of 8 – 10 when said reaction zone is moistened with water and to raise the vapor pressure of ammonia released by enzymatic hydrolysis of urea; and b. a pH indicator zone separate from the reaction zone containing an absorbent carrier impregnated with a colorimetric indicator responsive to ammonia liberated by said reaction zone.

2. An indicator according to claim 1, wherein said enzyme is urease having an activity of at least 5 U/mg.

3. An indicator according to claim 1, wherein said alkali metal is potassium, rubidium, cesium or mixtures thereof.

4. An indicator according to claim 3, wherein said alkali metal is present as cesium carbonate.

5. An indicator according to claim 1, wherein said reaction zone further contains an organic carboxylic or sulfonic acid.

6. An indicator according to claim 5, wherein said acid is at least one member selected from the group consisting of phthalic acid, isophthalic acid, salicylic acid, 5-sulfosalicylic acid, 5-nitrosalicylic acid and mellitic acid.

7. An indicator according to claim 1, wherein said reaction zone further contains an oxidation-inhibiting amount of an organic compound containing at least one —SH group.

8. An indicator according to claim 1, wherein said colorimetric indicator has a color change in the pH range of 6.8 – 3.0, inclusive.

9. An indicator according to claim 8, wherein said colorimetric indicator is selected from the group consisting of bromcresol green, bromphenol red, bromcresol purple and iron rhodanate.

10. An indicator according to claim 1, wherein said reaction zone and said indicator zone are spaced 1 – 20 mm. from each other on a common support.

11. An indicator according to claim 1, wherein said reaction zone is prepared by impregnation with an aqueous solution containing, per liter of distilled water,

| | | |
|---|---|---|
| 10–100 | g. | urease; |
| 5–500 | millimoles | alkali metal carbonate and/or alkali metal hydroxide; |
| 0–500 | millimoles | of at least one organic carboxcylic or sulfonic acid; and |
| 0.1–1.0 | g. | of an organic compound containing an -SH group. |

12. A process for the semiquantitative colorimetric determination of urea in solution which comprises moistening the reaction zone of an indicator according to claim 1 with a solution to be tested, subjecting the moistened indicator to conditions which permit urea hydrolysis and ammonia absorption to take place, and measuring the ascension level of the reacted indicator system as a function of urea content in the test solution.

* * * * *